July 3, 1956

P. R. STOUT ET AL 2,753,463

ATOMIC ENERGY RADIATION METER

Filed Oct. 4, 1952

INVENTORS
PERRY R. STOUT
CONSTANT C. DELWICHE

BY *Mellin and Hanscom*

ATTORNEYS

United States Patent Office 2,753,463
Patented July 3, 1956

2,753,463

ATOMIC ENERGY RADIATION METER

Perry R. Stout, Oakland, and Constant C. Delwiche, Berkeley, Calif., assignors to The Regents of The University of California, Berkeley, Calif.

Application October 4, 1952, Serial No. 313,146

1 Claim. (Cl. 250—83.3)

This invention relates in general to radiation meters.

Currently there is widespread fear of atom bombings and the resulting effects of atomic energy radiation.

In the event of atom bombings it will be highly desirable to measure the intensity of atomic energy radiation at various points throughout the affected areas. Due to the extended and unknown areas which might be involved, it appears that such measurements could be made most expeditiously by block wardens and other laymen active in the civilian defense program.

More specifically, it is the object of this invention to provide a simple, inexpensive and relatively foolproof atomic energy radiation meter essentially consisting of an electroscope hermetically sealed within a container sufficiently small to be held in the hand and wherein there is provided a hand pressure responsive servo charger for charging the electroscope by the same hand in which the meter is held, wherein a calibrated scale is provided in alignment with the electroscope and a window formed in the meter, wherein an artificial electric load or discharging resistor is associated with the electroscope for enabling the operator to determine at will whether the electroscope is in operating condition; and wherein there is incorporated in the electroscope casing a damage detector or moisture sensitive device.

The invention possesses other advantageous features, some of which, with the foregoing, will be set forth at length in the following description where that form of the invention which has been selected for illustration in the drawings accompanying and forming a part of the present specification, is outlined in full. In said drawings, one form of the invention is shown, but it is to be understood that it is not limited to such form, since the invention as set forth in the claim may be embodied in other forms.

Referring to the drawings.

Figure 1:
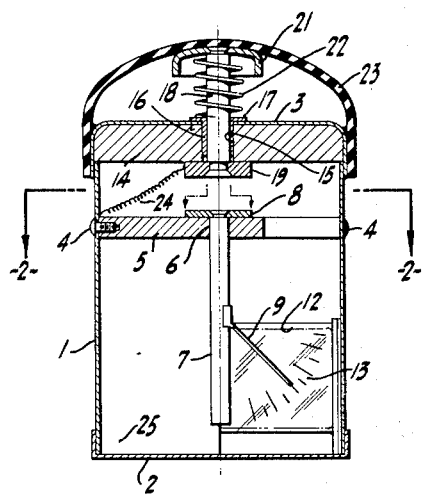
Fig. 1 is a vertical midsection taken through an energy meter embodying the objects of our invention.

The meter as illustrated in these various figures includes a metal container formed by a mathematically cylindrical metal body 1, hermetically sealed by a flanged bottom 2 and a flanged top 3, both of these latter elements being removable. Secured to and within the body 1 intermediate its ends by pins 4 is bracket or supporting member 5 made of a material having a high resistivity such as polystyrene and formed with a central bore 6. Press fitted into the bore 6 is a metal or carbon electrode 7 formed at its upper end with a flared contactor head 8. Hingedly mounted on the electrode 7 is an electroscope element or leaf 9 made of gold, aluminum or other suitable material and which with the electrode 7 forms a more or less conventional electroscope.

Provided on one side of the body 1 in visual alignment with the electroscope leaf 9 is a window 11 and provided on the opposite side of the body 1 in alignment with the leaf 9 and the window 11 is a transparent plate 12 inscribed with a graduated arcuate scale 13.

Operatively associated with the electrode 7 is an electroscope activator, motor or charger here illustrated as of the electret type and comprising a body 14 of an electret molded within the lower side of the cover 3 and formed with a central bore 15. Press fitted within the bore 15 is a slide bearing 16 formed at its upper end with a flange 17 and slidable therein is an insulated charging rod 18. Provided on the lower end of the rod 18 is a flat charging head 19 overlying and arranged to contact the contactor head 8. Affixed to the upper end of the rod 18 is an inverted presser knob 21 and surrounding the rod is a biasing spring 22 abutting the under side of the presser knob 21 at its upper end and contacting the flange 17 at its lower end.

Disposed over the presser knob 21 and sealed to the periphery of the top 3 is a flexible elastomer diaphragm or cap 23.

Connected between the charging head 19 and one of the pins 4 is a section 24 of silk or cotton thread serving as a "load" or "discharging resistor."

Disposed in the bottom of the container formed by the body 1 and its top 3 and bottom 2 is a body 25 of a cobalt acetate impregnated gel serving as a damage indicator, or more specifically, as a moisture indicator, for when the cobalt acetate is dry, it is blue but turns to red when hydrated.

Figure 3:
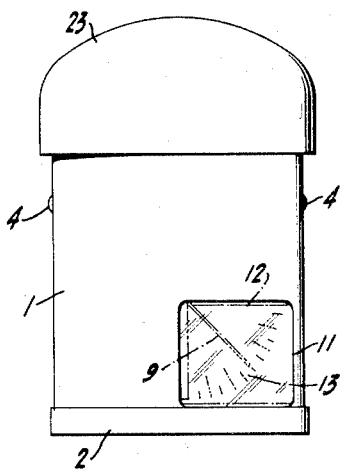
Fig. 3 is in front elevation of the meter illustrated in Figs. 1 and 2.
Figure 2:
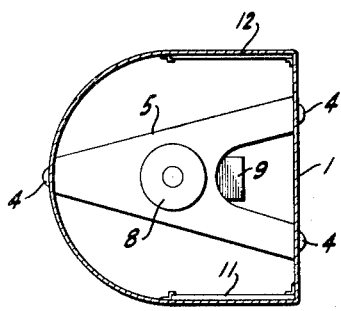
Fig. 2 is a horizontal section taken on the section line 2—2 of Fig. 1.
Figure 4:
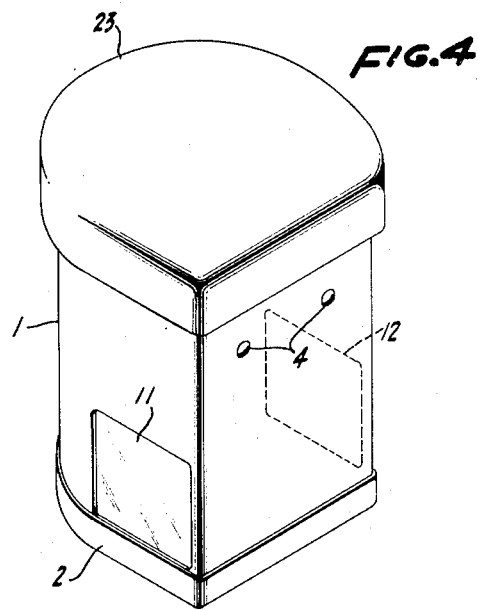
Fig. 4 is an isometer view of our meter.

The meter as above described is of a size such that it can be conveniently held and operated in one hand. When it is desired to charge the electroscope the rod 18 is depressed against the baising action of the spring 22 by applying pressure to the presser knob 21 through the elastomer cap 23. Upon parting from the electret 14, the charging head 19 is given a static charge, this charge being transferred to the contactor head 8 upon contact of the charging head 19 therewith. As a result of the charge so imposed on the head 8, the electroscope leaf 9 moves away from the electrode 7 assuming a position such as for example illustrated in Figs. 1 and 3. As above indicated, the cotton or silk thread 24 serves as a "discharging resistor" for when the charging head 19 is brought into contact with the contact head 8, the charge imparted to the electrode 7 is dissipated through the thread 24 at a fixed rate. The electroscope leaf 9 then responds as though the electroscope were being subjected to an intense field of high energy ionization radiation, thereby indicating to the operator that the meter is in proper operating condition. The "discharge resistor" also serves a second function in the event that the electroscope is overcharged for if the potential difference within the electroscope is greater than dsired, the charging head 19 can be pressed against the contactor head 8 and held there until the voltage on the electrode 7 falls to the desired potential. A third and important function of the "discharge resistor" is that it maintains the charging head 19 at the potential of the container when the "charging motor" constituted by the electret 14 and charging head 19 is not in use thereby preventing artifacts which would otherwise appear if the charging head 19 were not grounded out after each use.

As a result of making numerous experiments with instruments of the character above described under varying atmospheric conditions, we have found that during the fall and winter months conducting atmospheric contaminants are prevalent and would materially affect the operation of an electroscope if the latter were exposed thereto. It is for this reason that we have taken the precaution of hermetically sealing our meter. Furthermore we have found that a meter of this kind is highly sensitive to changes in the relative humidity of the atmosphere, this being a further reason for hermetically sealing the instrument. In the event that the instrument has lost its seal, this fact is indicated by the body of cobalt acetate incorporated therein. In short, our meter as above described is responsive solely to ionizing radiation, its performance being independent of variations in climatic conditions.

The simplicity of the device makes it possible to manufacture it at a sufficiently low cost to permit its wide distribution and its simplicity of operation makes it possible for unskilled laymen to use it and obtain accurate information therewith.

Although an electret type of charging device has here been resorted to for purposes of illustration, adhesive or friction type chargers can be utilized as substitutes.

The presence of atomic energy radiation of course serves to partially or entirely discharge the electroscope, the extent thereof being indicated by the angular position of the leaf 9, this position being ascertainable by looking through the window 11 and reading the scale 13. If desired, a printed table may be attached to the container indicating the length of time that the affected areas in question can be tolerated by a human in relation to the degree of ionization in such areas.

Having thus described our invention, what we claim and desire to secure by Letters Patent is:

An atomic energy radiation meter comprising a substantially moisture free container hermetically sealed under atmospheric pressure; a dielectric bracket mounted within said container intermediate the ends thereof; a depending electrode supported by said bracket, said electrode being provided at its lower end with an electroscope element; a window formed in said container opposite said electroscope element; a scale mounted within said container in visual alignment with said window and said scale; a body of an electret mounted within said container on a wall thereof opposite the fixed upper end of said electrode; a charging rod slidably mounted in said wall in axial alignment with said electrode and provided at its lower end with a charging head arranged to selectively contact said body of electret and the upper end of said electrode; an elastomer cap overlying the upper end of said charging rod and sealed at its marginal edges to said container; and means for outwardly biasing said charging rod normally to hold its charging head in contact with said body of electret and out of contact with said electrode and whereby said charging head can be moved out of contact with said body of electret and into contact with the upper end of said electrode upon the depression of said electrode.

References Cited in the file of this patent

UNITED STATES PATENTS

| | | |
|---|---|---|
| 2,610,302 | Christian | Sept. 9, 1952 |
| 2,623,184 | Montgomery et al. | Dec. 23, 1952 |
| 2,630,535 | Landsverk | Mar. 3, 1952 |
| 2,638,551 | Landsverk et al. | May 12, 1953 |
| 2,638,552 | Landsverk et al. | May 12, 1953 |
| 2,683,222 | Failla et al. | July 6, 1954 |
| 2,695,363 | Marvin | Nov. 23, 1954 |
| 2,700,109 | Argabrite | Jan. 18, 1955 |